United States Patent [19]

Uffner

[11] 4,332,705

[45] Jun. 1, 1982

[54] ASPHALT COMPOSITION MODIFIED WITH A RUBBERY POLYMER

[75] Inventor: William E. Uffner, Newark, Ohio

[73] Assignee: Owens-Corning Fiberglas Corporation, Toledo, Ohio

[21] Appl. No.: 144,711

[22] Filed: Apr. 28, 1980

[51] Int. Cl.$^3$ ............................................. C08L 91/00
[52] U.S. Cl. .................................. 523/206; 260/718; 260/733; 260/745; 260/758; 427/389.8; 428/440; 428/489; 523/209; 527/500; 524/71
[58] Field of Search ............... 260/28.5 AS, 718, 733, 260/745, 758; 427/389.8; 428/440, 489

[56] References Cited

U.S. PATENT DOCUMENTS 4,166,752  9/1979  Marzocchi et al. ......... 260/28.5 AS

FOREIGN PATENT DOCUMENTS 2015002  9/1979  United Kingdom ........ 260/28.5 AS

*Primary Examiner*—Melvyn I. Marquis
*Attorney, Agent, or Firm*—Ronald C. Hudgens; Robert F. Rywalski; Keith V. Rockey

[57] ABSTRACT

A rubber-modified asphalt composition prepared by reacting a bituminous material with a polymerizable aromatic monomer and a rubbery polymer whereby the rubbery polymer is chemically integrated with the asphalt. The rubber-modified asphalt compositions of the invention can be used in the treatment of glass fibers as well as in road-paving applications, roofing applications and the like.

16 Claims, No Drawings

ASPHALT COMPOSITION MODIFIED WITH A RUBBERY POLYMER

This invention relates to rubber-modified asphalt compositions, and more specifically to asphalt compositions which have been chemically modified to promote compatibility between the asphalt and reinforcements employed with the asphalt.

In application Ser. No. 881,108, filed Feb. 24, 1978, now abandoned, and Ser. No. 45,047, filed June 4, 1979, now U.S. Pat. No. 4,273,685, there is disclosed as asphalt composition which has been chemically modified with the rubbery polymer to increase fire retardancy and chemical reactivity of the asphalt. The modification of the asphalt with a rubbery polymer also has been found to promote compatibility between the asphalt and reinforcements used with the asphalt, notably glass fibers, glass flake and other organic and inorganic fillers and reinforcements.

The chemically-modified asphalts disclosed in the foregoing copending applications are prepared by reaction of a bitumen, and preferably asphalt, with a vinyl aromatic monomer such as styrene and a rubbery polymer. It has been postulated that the vinyl aromatic monomer employed as a coreactant is polymerizable with ethylenic unsaturation contained in the bitumen and thus serves to couple, by mean of chemical bonds, the asphalt molecules with the rubber polymer. The resulting chemically-modified asphalt can thus be cross linked with the use of a suitable crosslinking agent well known to those skilled in the art. In addition, the rubbery polymer which has been chemically bonded to the asphalt can serve as a source of reaction sites to establish a chemical bond between the chemically-modified asphalt and reinforcing fillers such as glass fibers, siliceous aggregate, glass flake and combinations thereof which may be blended with the chemically-modified asphalt in reinforced asphalt systems.

In the preparation of chemically-modified asphalt compositions as is described in the foregoing applications, it was found that the reaction could be caused to take place by simply contacting the rubbery polymer with the vinyl aromatic monomer, and heating the resulting mixture. It was found that, while a catalyst could be used to promote the reaction, the reaction would also proceed in the absence of the catalyst.

The resulting rubber-modified asphalt was found to be substantially free from tackiness and could be used in the treatment of glass fibers for a variety of applications, including road-paving applications, roof repair applications and the like.

One of the difficulties surrounding the preparation of rubber-modified compositions as is described in the foregoing applications stems from the fact that the reaction should be allowed to proceed for several hours, frequently for as many as 24 hours in order to produce a rubber-modified asphalt which is tack-free.

It is accordingly an object of this invention to provide a chemically-modified asphalt system which overcomes the disadvantages described above.

It is a more specific object of this invention to provide a chemically-modified asphalt wherein the asphalt molecules are chemically combined with elastomeric materials in a reaction in which the chemical integration between the elastomeric material and the asphalt can take place more quickly.

The concepts of this invention reside in a chemically-modified asphalt composition produced by the reaction of asphalt with a rubbery polymer and a polymerizable vinyl aromatic monomer containing at least two polymerizable groups. Without limiting the present invention as to theory, it is believed that the polyfunctional vinyl aromatic monomer, polymerizable with ethylenic unsaturation of the asphalt to couple the rubbery polymer to the asphalt, increases the rate at which the chemical integration of the rubbery polymer with the asphalt can take place.

The resulting chemically-modified asphalt has all the desirable characteristics of the asphalts described in the foregoing applications, and yet can be formed in a reaction requiring only a fraction of the reaction time. Such chemically-modified asphalts can thus be cross linked through the use of suitable cross-linking agents; the rubbery polymer chemically bonded to the asphalt can also serve as a source of reaction sites to establish a secure chemical bond between the chemically-modified asphalt and reinforcing fillers such as glass fibers (e.g., reinforcing strands or woven rovings), glass flake, siliceous aggregate and combinations thereof which are blended with or distributed in the chemically-modified asphalt in reinforced asphalt systems.

In the preferred practice of this invention, use is made of a polyfunctional vinyl aromatic monomer containing at least two ethylenically unsaturated aliphatic groups bonded to an aromatic ring. Illustrative of such polyfunctional monomers are those having the general formula:

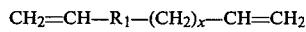
$$CH_2=CH-R_1-(CH_2)_x-CH=CH_2$$

wherein $R_1$ is an aromatic group such as a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_1$ can also be a heterocyclic group such as a pyridine group or a quinoline group or the like. Generally, $R_1$ is an aromatic group containing 6–12 carbon atoms. In the above formula, x is either 0 or an integer from 1 to 5.

Illustrative of suitable polyfunctional vinyl aromatic monomers are divinylbenezene, propenyl-substituted styrene, butenyl-substituted styrene, etc.

If the polyfunctional vinyl aromatic monomer is used alone as the only monomer, the product of the reaction is unsuitable, having a cheese-like consistency. Thus, the polyfunctional monomers as described above are used in combination with vinyl aromatic monomers having the general formula:

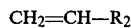
$$CH_2=CH-R_2$$

wherein $R_2$ is an aromatic group such as a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_2$ can also be a heterocyclic aromatic group such as a pyridyl group, a quinolyl group or the like. In general, $R_2$ is an aromatic group containing 6 to 12 carbon atoms.

Preferred is styrene, although various other polymerizable vinyl aromatic monomers can be used. Included are p-aminostyrene, o-methoxystyrene, 2-vinyl pyridine, 3-vinyl quinoline, etc.

As the rubbery polymer, use can be made of a number of elastomeric materials well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy and like substituted homopolymers of conjugated dienes may likewise be used in the practice of this invention. Such substituted butadienes are commercially available from, for example, Atlanta-Richfield under the trademark "Poly B-D", a series of hydroxy-terminated butadiene polymers; for example, use can be made of hydroxy-terminated butadiene homopolymers (e.g., Poly B-D R-15M which has a hydroxy number of 42 or Poly B-D R-45M).

In addition, use can preferably be made, as the rubbery polymers, of elastomeric materials formed by co-polymerization of one or more of the conjugated dienes described above with one or more ethylenic monomers such as styrene as well as lower alkyl, hydroxy, amino and mercaptosubstituted derivatives thereof, acrylonitrile, methoacrylonitrile acrylic acid, methacrylic acid, etc. Included are butadiene-styrene rubbers, butadiene-acrylonitrile rubbers, etc. Hydroxy-terminated copolymers are likewise useful in the practice of this invention, including the hydroxyterminated butadiene-styrene copolymer designated "Poly B-D CS-15" and hydroxy-terminated butadiene-acrylonitrile copolymers (e.g., Poly B-D CN-15 having a hydroxyl number of 39). Desirably, the copolymer is a butadiene-styrene copolymer containing a major portion of butadiene, e.g. SBR rubber marketed by Phillips Petroleum Co.

In carrying out the reaction of the asphalt with the vinyl aromatic monomers and the rubbery polymer, it has been found that no catalysts are required, although free radical catalysts may be used, if desired. It is sufficient that the mixture of the asphalt, vinyl aromatic monomer and the rubbery polymer be heated to a temperature ranging from 300° to 500° F., and preferably 330° to 360° F., to promote the reaction. As will be appreciated by those skilled in the art, the reaction time is somewhat dependent on the reaction temperature with higher temperatures favoring a more rapid rate of reaction. If desired, the asphalt can be, prior to reaction with the vinyl aromatic monomers and the rubbery polymer, dissolved in an inert organic solvent, preferably an aromatic solvent, although the use of the solvent is not necessary. It is generally preferred to carry out the reaction under non-oxidizing conditions to avoid combustion. Use of a vacuum or an inert gas can be made for that purpose.

The relative proportions of the monomer and the rubbery polymers are not critical to the practice of this invention and can be varied within relatively wide ranges. In general, use is made of a monomer content corresponding to 0.5 to 40% by weight based on the weight of the asphalt, and a rubbery polymer in an amount ranging from 0.5 to 35% by weight based upon the weight of the asphalt.

In general, use should be made of a weight proportion of monofunctional monomer to polyfunctional monomer within the range of 1 to 40, and preferably 5 to 25 for best results.

In carrying out the reaction used to produce rubber-modified asphalts of this invention, use can be made of ordinary asphalt or asphalt which has been modified by reaction with air (e.g., blown asphalt) or steam.

It has been found that the interreaction of a vinyl aromatic monomer and the rubbery polymer with the asphalt produces a highly cross linked asphalt which is non-tacky at ordinary temperatures. The resulting asphalt, having improved compressive strength, can thus be used in a variety of applications. For example, the asphalt compositions of this invention are highly suitable for use in road-paving applications, and particularly road-paving applications wherein the asphalt is reinforced with glass, either in the form of glass fibers or in the form of glass flake or other reinforcing materials. It is believed that the reaction of the vinyl aromatic compound and the rubbery polymer serves to impart to the asphalt reactive groups which are capable of establishing a chemical bond between the asphalt and glass used as reinforcement.

In addition, asphalt compositions of this invention can also be used in applications where asphalt is reinforced with a siliceous fillers other than glass or in addition to glass, notably including siliceous aggregates.

In one form of the invention, the asphalt compositions of this invention can be used in the treatment of glass fibers to improve the bonding relationship between the glass fibers and a wide variety of materials reinforced with glass. For example, the asphalt compositions of the invention can be applied as a thin coating to individual glass fiber filaments, or as an impregnant to bundles of glass fibers whereby the asphalt coating or impregnant serves to intertie the glass fiber surfaces with, for example, treated or untreated asphalt used in road-paving applications. In this embodiment of the invention, the coated or impregnated glass fibers can advantageously be used as reinforcement for unmodified asphalt in road-paving applications whereby the asphalt matrix of the road-paving material is chemically bonded to the coating or the impregnant to the glass fibers. The asphalt forming the coating or impregnant, in turn, serves to intertie the chemically-modified asphalt of this invention with the untreated asphalt, the latter forming a continuous phase in which the coated or impregnated glass fibers are distributed as reinforcement.

The chemically-modified asphalt can be employed alone in road-paving or road repair applications, or can be blended with glass fibers or flake to provide reinforcement for the asphalt. The chemically-modified asphalt is particularly well suited for use in the repair of asphalt pavement because the asphalt of the invention, as a result of chemical modification, has many outstanding properties, such as non-tracking and non-bleeding properties and good cold-temperature flex.

In addition, asphalt-treated glass fibers of this invention can also be used as reinforcement for other materials, including, but not limited to, rubber in the manufacture of glass fiber-reinforced elastomeric products, such as tires, and plastics, as in the manufacture of glass fiber-reinforced plastics.

The chemically-modified asphalt of this invention is well suited for use in the repair of "potholes" and cracks in pavements as well as a joint sealer. In "pothole" repairs, it is desirable to dispense the chemically-modified asphalt of the invention about the hole to be repaired to form in the nature of a circumscribing wall about the hole. The hole is then preferably partially filled with the chemically-modified asphalt of the invention, and then substantially completely filled with either a conventional cold mix or ground recycled asphalt. The area under repair is then overcoated with the asphalt of the invention or, if desired, glass fiber reinforcement is positioned over the repair area and then the overcoating applied. The glass fiber-reinforcement can be in the form of mats formed of glass fibers such as chopped strand mats, continuous strand mats, swirl mats, woven and non-woven fabrics, woven rovings, scrim and the like.

When used in the coating or impregnation of glass fibers or bundles of glass fibers, respectively, use can be made of asphalt compositions of this invention in amounts over relatively wide ranges. Generally, the coating or impregnant is applied in an amount sufficient to constitute from 0.1 to about 50% by weight, or even higher, of the weight of the glass fibers.

It has been found, in accordance with the practice of this invention that, when applying asphalt compositions of this invention to glass fibers, either as a thin film coating on the individual glass fiber filaments or as an impregnant, it may be desirable to heat the asphalt after it has been applied to the glass fiber surfaces. That optional heat treatment step serves to set the asphalt coating on the glass fiber surfaces, and, at the same time, to insolubilize by further cross linking the asphalt thereon. The heating step has been found to increase the wet strength of the asphalt-treated glass fibers significantly.

In carrying out the optional heating step as described above, it is sufficient that the asphalt-treated glass fibers be heated to a temperature ranging from 200°–500° F., depending somewhat on the softening point of the asphalt involved.

Having described the basic concepts of the present invention, reference is now made to the following examples, which are provided by way of illustration and not by way of limitation, of the practice of this invention in the preparation of chemically-modified asphalts and their use.

EXAMPLE 1

This example illustrates a comparison in reaction times using a system of the present invention in which a portion of a monofunctional monomer is replaced by divinyl benzene as compared to the use of styrene itself.

A rubber-modified asphalt is prepared by mixing together the following components:

|  | Parts by weight |
| --- | --- |
| Asphalt (AC-20) | 775 |
| Styrene | 100 |
| Butadiene-styrene rubber | 125 |

The reaction mixture was heated to 325° F. for 24 hours to produce a rubber-modified asphalt which is essentially tack-free.

In a reaction illustrating the concepts of this invention, 25% of the styrene is replaced by 55% by weight divinyl benzene (the remaining components of the mixture being typical impurities in divinyl benzene including benzene, toluene, ethylvinyl benzene and diethyl benzene). The reaction mixture was thus composed of the following:

|  | Parts by weight |
| --- | --- |
| Asphalt (AC-20) | 775 |
| Styrene | 75 |

| | Parts by weight |
| --- | --- |
| Divinyl benzene (55% by weight) | 25 |
| Butadiene-styrene rubber | 125 |

After only 7 hours of reaction, the product produced from the reaction utilizing divinyl benzene had the same physical properties as the product of the comparative example utilizing only styrene as the polymerizable monomer only after 24 hours of reaction.

EXAMPLE 2

The procedure of Example 1 was repeated using the following reaction mixture:

|  | Parts by weight |
| --- | --- |
| Asphalt | 800 |
| Styrene | 50 |
| Divinyl benzene (55% by weight) | 25 |
| Butadiene rubber | 150 |

After approximately 7 hours, the rubber-modified asphalt produced was substantially free of tackiness and was found to have good physical properties.

EXAMPLE 3

Using the procedure described in Example 2 above, a blown asphalt having an oxygen content of 0.49% by weight was reacted with styrene, divinyl benzene and a butadieneacrylonitrile rubber.

The resulting rubber-modified asphalt can then be applied as a coating to glass fibers to establish a secure bonding relationship between the rubber-modified asphalt and the glass fiber surfaces, preferably after the glass fibers have been sized in forming with a size composition containing a coupling agent in the form of an organo silane.

EXAMPLE 4

Utilizing the procedures described above, a chemically-modified asphalt is prepared by reacting 775 parts by weight of AC-20 asphalt, 90 parts by weight styrene, 125 parts by weight of butadiene-styrene rubber (Solprene 1205C) and 10 parts by weight of divinyl benzene, the 10 parts by weight being composed of about 55% by weight divinyl benzene, 41% by weight ethylvinyl benzene, 2.5% by weight diethyl benzene and 1.5% by weight naphthalene. The reaction is carried out at a temperature of about 172–175 C. for about 7 hours.

It will be understood that various changes and modifications can be made in the details of procedure, formulation and use without departing from the spirit of the invention, especially as defined in the following claims.

What is claimed is:

1. A chemically-modified asphalt composition comprising an asphalt which has been reacted with (1) a polymerizable monofunctional vinyl aromatic monomer, (2) a polyfunctional polymerizable vinyl aromatic monomer having the formula:

$$CH_2=CH-R_1-(CH_2)_x-CH=CH_2$$

wherein $R_1$ is an aromatic group containing 6 to 12 carbon atoms and x is 0 or an integer from 1 to 5 and (3) a rubbery polymer.

2. A chemically-modified asphalt composition as defined in claim 1 wherein the rubbery polymer is selected from the group consisting of homopolymers of a conjugated diene and copolymers formed of a conjugated diene and at least one ethylenic monomer copolymerizable therewith.

3. A chemically-modified asphalt composition as defined in claim 2 wherein the ethylenic monomer is selected from the group consisting of styrene, acrylonitrile, methacrylonitrile, acrylic acid, methacrylic acid, hydroxystyrene, aminostyrene and mercaptostyrene.

4. A chemically-modified asphalt as defined in claim 1 wherein the asphalt to be reacted is an asphalt which has been prereacted with a modifying agent selected from the group consisting of steam, an oxygen-containing gas, ammonia and organic amines.

5. A chemically-modified asphalt as defined in claim 1 wherein the monovinyl aromatic monomer is styrene.

6. A chemically-modified asphalt as defined in claim 1 wherein the polyfunctional vinyl aromatic monomer is divinyl benzene.

7. A chemically-modified asphalt as defined in claim 1 wherein the total of the vinyl aromatic monomers used in the reaction is an amount within the range of 0.5 to 40% by weight based on the weight of the asphalt.

8. A chemically-modified asphalt as defined in claim 1 wherein the rubbery polymer is reacted in an amount ranging from 0.5 to 35% by weight based on the weight of the asphalt.

9. A chemically-modified asphalt as defined in claim 1 wherein the ratio of the monofunctional vinyl aromatic monomer to the polyfunctional vinyl aromatic monomer ranges from 1 to 40.

10. Glass fibers having a coating thereon, said coating comprising a chemically-modified asphalt as defined in claim 1.

11. Glass fibers as defined in claim 9 wherein the glass fibers are in the form of a bundle and the coating constitutes an impregnant in the bundle.

12. In a glass fiber reinforced asphalt wherein an asphalt constitutes a continuous phase in which the glass fibers are distributed as reinforcement, the improvement comprising, as the continuous phase, a chemically-modified asphalt as defined in claim 1.

13. In a glass fiber reinforced asphalt wherein an asphalt constitutes a continuous phase in which glass fibers, having a coating thereon, are distributed through the continuous phase as reinforcement, the improvement comprising glass fibers which have been coated with a chemically-modified asphalt as defined in claim 1.

14. In a method for the preparation of a chemically-modified asphalt composition wherein an asphalt is reacted with a rubbery polymer and a polymerizable monoaromatic monomer, the improvement comprising increasing the rate of reaction by using a polyfunctional polymerizable vinyl aromatic monomer as a coreactant with a polymerizable monofunctional vinyl aromatic monomer having the formula:

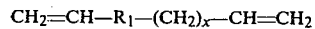

wherein $R_1$ is an aromatic group containing 6 to 12 carbon atoms and x is 0 or an integer from 1 to 5.

15. A method as defined in claim 14 wherein the polyfunctional polymerizable vinyl aromatic monomer is divinyl benzene.

16. In a laminated product comprising a reinforcing fabric having a coating thereon, said coating comprising the chemically-modified asphalt of claim 1.

* * * * *